(12) United States Patent
Gehrig

(10) Patent No.: US 11,655,911 B2
(45) Date of Patent: May 23, 2023

(54) LINEAR DRIVE

(71) Applicant: WITTENSTEIN SE, Igersheim (DE)

(72) Inventor: Tobias Gehrig, Ahorn (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 17/544,173

(22) Filed: Dec. 7, 2021

(65) Prior Publication Data
US 2022/0178463 A1 Jun. 9, 2022

(30) Foreign Application Priority Data

Dec. 9, 2020 (DE) .......................... 102020132793.5

(51) Int. Cl.
*F16K 31/53* (2006.01)
*F16K 31/52* (2006.01)

(52) U.S. Cl.
CPC ............ *F16K 31/53* (2013.01); *F16K 31/523* (2013.01)

(58) Field of Classification Search
CPC ........ F16K 31/53; F16K 31/523; F16H 21/34; F16H 37/065; F16H 37/124
See application file for complete search history.

(56) References Cited

U.S. PATENT DOCUMENTS

| 2,330,229 A | 12/1945 | Thompson |
| 2015/0184773 A1 | 7/2015 | Hermann |
| 2018/0155053 A1 | 6/2018 | Wang et al. |
| 2019/0301635 A1 | 10/2019 | Glaser et al. |

FOREIGN PATENT DOCUMENTS

| DE | 102012017705 A1 | 3/2014 |
| EP | 1310701 | 5/2003 |
| GB | 1200277 A | 7/1970 |
| WO | 200066913 | 11/2000 |

OTHER PUBLICATIONS

Search Report in connection to EP Application No. 21213025.6, dated Feb. 18, 2022.
German Search Report dated issued in Application No. 102020132793.5, dated May 21, 2021 (7 pages).

*Primary Examiner* — Kelsey E Cary
(74) *Attorney, Agent, or Firm* — Meunier Carlin & Curfman LLC

(57) ABSTRACT

Linear drive, in particular for converting a rotational movement into a linear movement for actuating a valve including a shut-off slide, having a crank mechanism, the linear drive comprising a first crankshaft associated with a piston rod via a first connecting rod, a second crankshaft associated with the piston rod via a second connecting rod, and a planetary gear for rotationally driving the first crankshaft and the second crankshaft.

13 Claims, 3 Drawing Sheets

US 11,655,911 B2

LINEAR DRIVE

CROSS REFERENCE TO RELATED APPLICATIONS

This application is a Paris Convention Patent Application which claims the benefit of priority to German Application No. 102020132793.5, filed Dec. 9, 2020, which is incorporated by reference herein in its entirety.

FIELD OF THE INVENTION

The invention relates to a linear drive, in particular for converting a rotational movement into a linear movement for actuating a valve including a shut-off slide.

STATE OF THE ART

Linear drives are known from the state of the art, for example, for being used in shut-off devices for an application in the subsea area. Thus, from the publication of the US application US 2019/0301635 A1, a subsea shut-off device is known which converts the rotation of a motor by means of a crank drive into a linear movement so as to actuate a valve.

However, it is in part necessary to make the linear drive smaller, more compact or stronger in torque at equal construction size.

DISCLOSURE OF THE INVENTION

The task of the invention is to provide a linear drive which is constructed to be compact or provides an increased drive force at a substantially similar construction size.

The task is solved by a linear drive according to claim 1 and a use of a corresponding linear drive for actuating a valve according to the alternative independent claim.

A first aspect of the invention relates to a linear drive, in particular for converting a rotational movement into a linear movement for actuating a valve including a shut-off slide, having a crank mechanism, the linear drive comprising a first crankshaft associated with a piston rod via a first connecting rod, a second crankshaft associated with a piston rod via a second connecting rod, and a planetary gear for rotationally driving the first crankshaft and the second crankshaft.

A further aspect of the invention relates to a use of a linear drive in one of the typical embodiments described herein for actuating a valve including a shut-off slide according to the alternative independent claim.

As far as the term "gear" in the context of the linear drive according to the invention is used herein, the planetary gear of the linear drive is usually meant.

A typical use of linear drives described herein is actuating a valve including a shut-off slide in a water depth of at least 30 m for controlling the flow in an oil or gas production facility.

In typical embodiments, the planetary gear is associated with a motor so as to be driven by the motor. Typically, a planetary carrier of the planetary gear is in engagement with a driving shaft of a motor. Typical engaging connections may be a bevel gear wheel, a gear with a pinion, typically a bevel pinion, with a crown wheel. In further embodiments, the planetary carrier is directly associated with the rotor of a motor or formed in one piece with same.

Typically, the electric motor or the planetary gear is arranged in an oil-filled housing together or the electric motor and the gear are arranged separated in two oil-filled housings. Typically, the housing is or the housings are configured to withstand a depth pressure in 1000 m water depth. Typical housings are water-tight or oil-filled.

In typical embodiments, the crankshafts are typically located on the same axis. During operation, the crankshafts typically rotate in opposite directions. Both crankshafts typically act upon the same piston rod via the connecting rods. For driving the two crankshafts, a planetary gear is employed as a distribution gear.

Typical planetary gears of embodiments are arranged as power-distributed gears. In particular, a power-distribution to the two crankshafts is generated. The gear thus has a drive typically engaged with a shaft of a motor, and two outputs each directly associated with one of the two crankshafts. This means that the reaction moment, which is introduced into the housing in a standard planetary gear having a stationary internal gear, is used in this invention as a second output and thus for driving the second crankshaft. The distributed power is united again in the piston rods via the crankshafts and the connecting rods.

The realization of the planetary gear can basically take place in various construction forms. Typical embodiments use the construction form 7 according to VDI 2157. The two internal gears of the planetary gear each form an output and are each associated with one of the crankshafts. Driving of the planetary gear may take place mechanically, for example, via a bevel gear. As an alternative, the planetary carrier may also be integrated into the rotor of an electric motor.

Typically, the first crankshaft is associated with an internal gear of the planetary gear. The second crankshaft is in particular associated with a further internal gear of the planetary gear.

Typically, the planetary gear comprises a first planetary set and a second planetary set, which are arranged on a common planetary carrier. In typical embodiments, the planetary carrier is arranged to be centered or between the planetary sets. Typically, the first planetary set is in engagement with the first internal gear, and the second planetary set is in engagement with the second internal gear.

Typically, the planetary wheels of the first planetary set are each associated in a torque-proof manner with the respective planetary wheel of the second planetary set. Embodiments in particular do not comprise any sun wheel or are free from a sun wheel.

With respect to the standard application of planetary gears, in which the reaction moment is introduced into the housing via the internal gear and remains unused, embodiments can offer the advantage that the usable total torque is composed of the sum of output torque and reaction moment. For achieving the required torque, the gear and thus the linear drive as a whole may be configured to be more compact.

Typically, the construction form of the planetary gear is adapted in embodiments such that the gear can be integrated in the form of an electric motor or may take place by means of an angular gear in the axial direction of the piston rod. The complete linear drive may thus be designed to be very compact in a simple constructional manner. In case of confined space conditions, embodiments having an integrated motor can offer advantages.

In further embodiments, the planetary wheels of the first planetary set and the planetary wheels of the second planetary set are arranged to be twistable relative to one another on their respective rotational axes. The planetary wheels engage into the sun wheels, which are arranged on a common central sun shaft in a torque-proof manner. The sun wheels thus have the same rotary speed and torque during operation. The first crankshaft in turn is associated in a torque-proof manner with the first internal gear or integrally formed with it, and the second crankshaft is associated in a torque-proof manner with the second internal gear or integrally formed with it. In such embodiments, the achievable transmission ratios may be reduced, the embodiment, however, can have the advantage that it is easy to install.

Variants of power-distributed planetary gears are also possible, in which the first crankshaft is associated in a torque-proof manner with the first internal gear, and the second crankshaft is associated in a torque-proof manner with a planetary carrier. In typical embodiments, the planetary gear has a sun wheel, which is in engagement with a driving shaft.

In typical embodiments, the rotational axis of the planetary gear is arranged coaxially to the respective rotational axes of the crankshafts. The crankshafts are in particular freely rotatable—apart from the association with the connecting rod and the engagement of the internal gear into the planetary wheels.

In typical linear drives, the first crankshaft has a first transmission ratio, and the second crankshaft has a second transmission ratio which is different with respect to the first transmission. The term "transmission ratio of the crankshaft" in particular respectively means the transmission ratio of the planetary wheels to the respective internal gear or the respective crankshaft. Typically, the crankshafts rotate during operation in opposite directions, in particular in case of a drive via the planetary carrier due to the different transmission ratios.

Typical embodiments comprise a first slotted link limiting the rotation range of the first crankshaft, and a second slotted link limiting the rotation range of the second crankshaft in each case to a maximum of 180°, typically to less than 180° or typically to a maximum of 175° or a maximum of 170°. The term "slotted link" may be related only to corresponding stops or preferably designate complete guides including stops.

Typical embodiments offer the advantage that they can be configured to be compact. The planetary gear is capable of a high transmission ratio so that a high reaction moment is achieved while well using the space.

BRIEF DESCRIPTION OF THE DRAWINGS

Further advantages and features of preferred embodiments of the invention will be explained below on the basis of the attached schematic drawings. The Figures show.

DESCRIPTION OF PREFERRED EXEMPLARY EMBODIMENTS

Typical embodiments will be described in the following on the basis of the Figures, wherein the invention is not restricted to the exemplary embodiments, the scope of the invention being rather determined by the claims.

Figure 1:
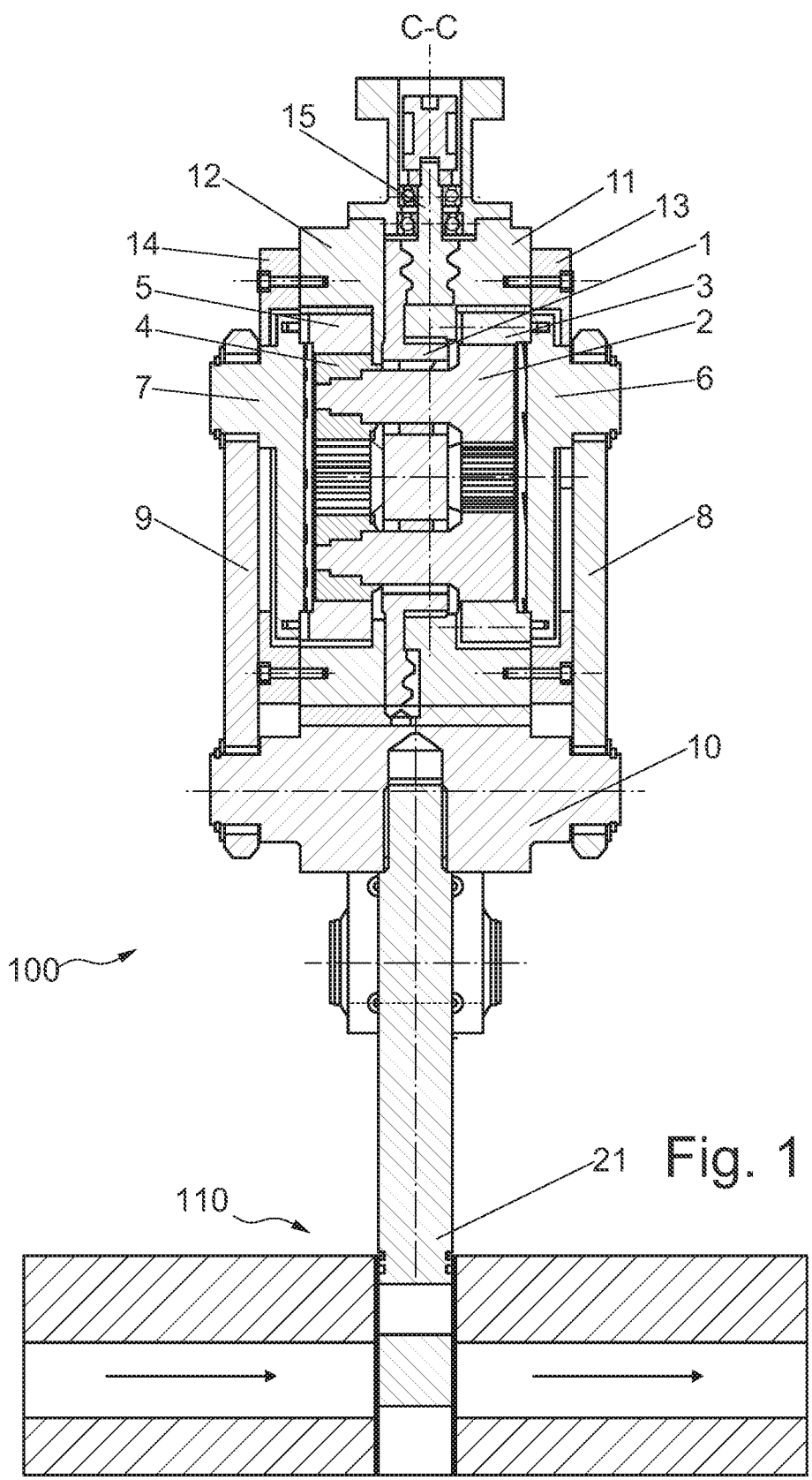
FIG. 1 a typical embodiment of a linear drive in a schematic sectional view.

In FIG. 1, a typical embodiment of a linear drive 100 is shown in a schematic sectional view.

The linear drive 100 serves for linearly driving a piston rod 10 associated with a seating. In the representation of FIG. 1, the piston rod 10 is moved upwards and downwards in the drawing plane. In typical embodiments, the piston rod 10 is in association with a shut-off slide 21 of a valve 110, in particular of a subsea valve.

The linear drive 100 is driven by a motor (not illustrated), the shaft of which is associated with a bevel pinion 15 in a torque-proof manner. The bevel pinion 15 is in engagement with a crown wheel configured to be in one piece with a planetary carrier 1 and drives this planetary carrier 1 by means of the crown wheel.

In the planetary carrier 1, a first planetary set having first planetary wheels 2, and a second planetary set having second planetary wheels 4 are arranged. The first planetary wheels 2 (only one being illustrated in FIG. 1) of the first planetary set are each in torque-proof association with the respective planetary wheel 4 (only one being illustrated in FIG. 1) of the second planetary set. However, the planetary wheels 2 and 4 of the two planetary sets, which are each in torque-proof association, in turn are mounted to be rotatable within the planetary carrier 1 via a planetary shaft configured in one piece with one of the planetary wheels 2 and 4.

The first planetary wheels 2 of the first planetary set engage into a first internal gear 3. The second planetary wheels 4 of the second planetary set engage into a second internal gear 5 here also referred to as a further internal gear.

The first internal gear 3, and the second or further internal gear 5 are mounted rotatable on a common axis with the planetary carrier 1 in a housing having the housing parts 11 and 12.

The tooth number ratios, and thus the first transmission ratio of the first planetary wheels 2 of the first planetary set, to the first internal gear 3 are different from the tooth number ratios and the second transmission ratio of the second planetary wheels 4 to the second internal gear 5. A rotation of the planetary carrier 1 during operation corresponding to the different transmissions ratios results in a relative movement of the first internal gear 3 with respect to the second internal gear 5. In the exemplary embodiment illustrated in FIG. 1, the first internal gear 3 has 108 teeth, and the second internal gear 5 has 109 teeth. The first planetary wheels 2 have 41 teeth, and the second planetary wheels 4 have 42 teeth. In further exemplary embodiments, other combinations may be used so as to achieve different transmission ratios.

In typical embodiments, the crankshafts are configured to be rather disc-shaped, namely having an axial thickness which is smaller than their respective diameter. This enables a compact construction form.

A first crankshaft 6 is in torque-proof association with the first internal gear 3. A second crankshaft 7 is in torque-proof association with the second internal gear 5. The two crankshafts 6 and 7 are in articulated association with the piston rod 10 via respectively one coupling rod or connecting rod 8 and 9. This association provides for the two crankshafts 6 and to rotate synchronously, thus at the same speed, but, if necessary, in different directions.

The pivot angle of the crankshaft 6 is limited to 180° between an upper and a lower dead point by a slotted link 13. The pivot angle of the crankshaft 7 is limited to 180° between an upper and a lower dead point by a slotted link 14. The stops of the slotted links 13 and 14 are arranged so that the two crankshafts 6 and 7, when turning from the respective upper dead point to the respective lower dead point, are required to rotate in opposite directions.

The drive of the planetary carrier in typical embodiments results in a rotation of the internal gears taking place synchronously in opposite directions. This rotational movement is converted into a linear movement of the piston rod via the crankshafts and the coupling rods.

Figure 2:
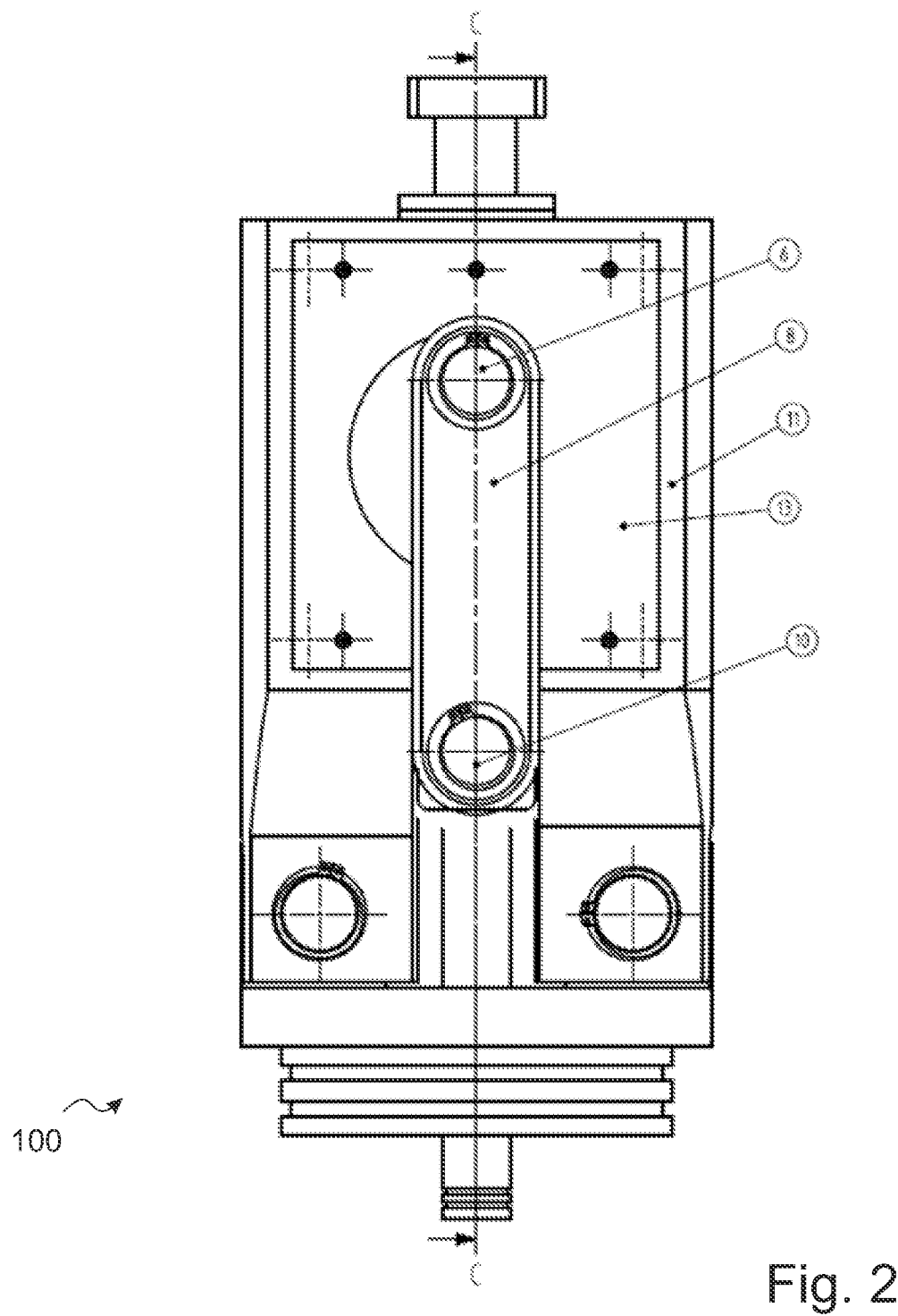
FIG. 2 the embodiment of FIG. 1 in a schematic side view.

In FIG. 2, a side view of the embodiment of FIG. 1 is shown. The reference numerals used in FIG. 1 and also in FIG. 3 correspond to those of FIG. 1, wherein not all of the parts need to be provided with a reference numeral again, and in the text, not all of the elements provided with a reference numeral are described again.

In FIG. 2, the rotational angle limitation caused by the slotted link 13 can be recognized. At the opposite side (namely at the rear side of the linear drive 100 in FIG. 2), an oppositely mounted slotted link (reference numeral 14 in FIG. 1) is arranged allowing a rotational movement in the opposite direction.

Figure 3:
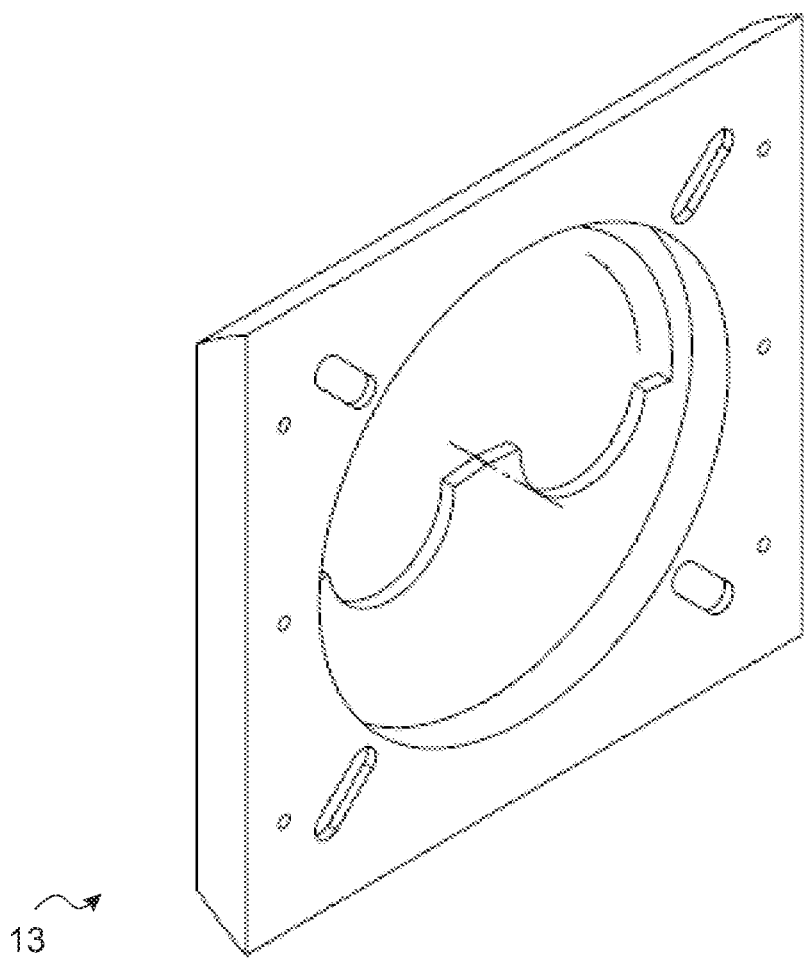
FIG. 3 a slotted link of the embodiment of FIGS. 1 and 2 in a schematic perspective view.

FIG. 3 shows the slotted link 13 in a schematic perspective view. The slotted links 13 and 14 are configured to be structurally identical but will be mounted oppositely in an opposite axial orientation so as to achieve the opposite movement of the crankshafts.

The construction form of the planetary gear enables a very high transmission ratio. The output torques in the two internal gears thus are almost identical. At the output side, no reaction moment is introduced into the housing from the planetary gear.

The invention claimed is:

1. A linear drive having a crank mechanism, the linear drive comprising:
   a first crankshaft associated with a piston rod via a first connecting rod,
   a second crankshaft associated with the piston rod via a second connecting rod, and
   a planetary gear for rotationally driving the first crankshaft and the second crankshaft,
   wherein the first crankshaft is associated with an internal gear of the planetary gear, and wherein the second crankshaft is associated with a further internal gear of the planetary gear.

2. The linear drive according to claim 1, wherein the planetary gear is configured as a power-distributed gear.

3. The linear drive according to claim 1, wherein the planetary gear comprises a first planetary set and a second planetary set, which are arranged on a common planetary carrier.

4. The linear drive according to claim 3, wherein planetary wheels of the first planetary set are each associated with a respective planetary wheel of the second planetary set in a torque-proof manner.

5. The linear drive according to claim 3, wherein the planetary carrier is in engagement with a driving shaft.

6. The linear drive according to claim 5, wherein the driving shaft is in engagement with the planetary carrier by means of a bevel pinion.

7. The linear drive according to claim 3, wherein the planetary carrier is configured as a crown wheel or integrally comprises a crown wheel.

8. The linear drive according to claim 1, wherein a rotational axis of the planetary gear is coaxial to respective rotational axes of the first crankshaft and the second crankshaft.

9. The linear drive according to claim 1, comprising a first slotted link and a second slotted link respectively limiting the rotation range of the first crankshaft and the rotation range of the second crankshaft to a maximum of 180°.

10. The linear drive according to claim 1, wherein the linear drive is used for actuating a valve including a shut-off slide.

11. The linear drive according to claim 10, wherein the linear drive is used for controlling the flow in an oil or gas production facility in a water depth of at least 30 m.

12. A linear drive having a crank mechanism, the linear drive comprising:
   a first crankshaft associated with a piston rod via a first connecting rod,
   a second crankshaft associated with the piston rod via a second connecting rod, and
   a planetary gear for rotationally driving the first crankshaft and the second crankshaft,
   wherein the first crankshaft has a first transmission ratio, and the second crankshaft has a second transmission ratio, which is different with respect to the first transmission ratio.

13. A linear drive having a crank mechanism, the linear drive comprising:
   a first crankshaft associated with a piston rod via a first connecting rod,
   a second crankshaft associated with the piston rod via a second connecting rod, and
   a planetary gear for rotationally driving the first crankshaft and the second crankshaft,
   wherein the crankshafts rotate in opposite directions during operation.

* * * * *